Mar. 6, 1923.

E. C. HATCHER ET AL.
TRANSMISSION GEARING.
FILED MAY 2, 1922.

INVENTORS
Ernest C. Hatcher
Thomas Rooke

By
Attorney

Mar. 6, 1923.

E. C. HATCHER ET AL.
TRANSMISSION GEARING.
FILED MAY 2, 1922.

INVENTORS
Ernest C. Hatcher
Thomas Rooke

By
Charles L. Norris
Attorney.

Patented Mar. 6, 1923.

1,447,845

UNITED STATES PATENT OFFICE.

ERNEST CHARLES HATCHER AND THOMAS ROOKE, OF LONDON, ENGLAND.

TRANSMISSION GEARING.

Application filed May 2, 1922. Serial No. 557,892.

*To all whom it may concern:*

Be it known that we, ERNEST CHARLES HATCHER, a subject of the King of Great Britain, residing at London, England, and THOMAS ROOKE, a subject of the King of Great Britain, residing at London, England, have invented a new and useful Improved Transmission Gearing, of which the following is a specification.

This invention relates to improvements in variable speed and reversing gearing of the kind comprising spindles mounted in a cage and geared together, one of the said spindles having mounted thereon a worm wheel or helical gear in gear with a worm or helical gear on the driving shaft and the other spindle having mounted thereon a worm or helical gear in gear with a worm wheel or helical gear on the driven shaft.

The said invention provides gearing of the kind hereinabove referred to comprising two or more trains of gearing between the driving and the driven shafts, respectively giving different velocity ratios, and rotating the driven shaft in the same or in the opposite direction to that in which the driving shaft rotates. These trains of gearing are put into operation by clutches which may conveniently be arranged so that only one train of gearing is operative at any given time. In some cases the several trains of gearing may be so arranged that each train comprises an equal number of gears of a like kind arranged in the same order in the train. At a convenient part of each train of gearing connecting the driving and driven shafts, a clutch is provided so that the train can be rendered operative or inoperative, for example, this clutch can be arranged to couple one of the spindles to one of the gears carried thereon, which may be either the gear connecting the spindle to the corresponding shaft, or the gear connecting one spindle to the other spindle.

The cage carrying the spindles may be mounted so that it can rotate and a clutch device is then provided whereby the cage or the driven member of the train of bearing, i. e., the worm wheel on the driven shaft, can be held against rotation, alternatively, and the member not so held can be simultaneously positively clutched or coupled to the driven shaft. The said clutch device is moreover adapted to couple the cage and the driven member of the gearing simultaneously to the driven shaft, whilst the cage and driven member are set free to rotate with the driving shaft. Any convenient form of clutch construction may be employed in providing the required clutch members, toothed or dog clutches being sometimes preferable, but other constructions of clutch such as a friction, magnetic or liquid circulation clutch may be substituted where practicable. The operation of the clutch device for holding or releasing the cage allows the driven shaft to be rotated in either direction without changing the train of gearing through which motion is transmitted from the driving shaft.

In the accompanying drawings:—

Figure 1:
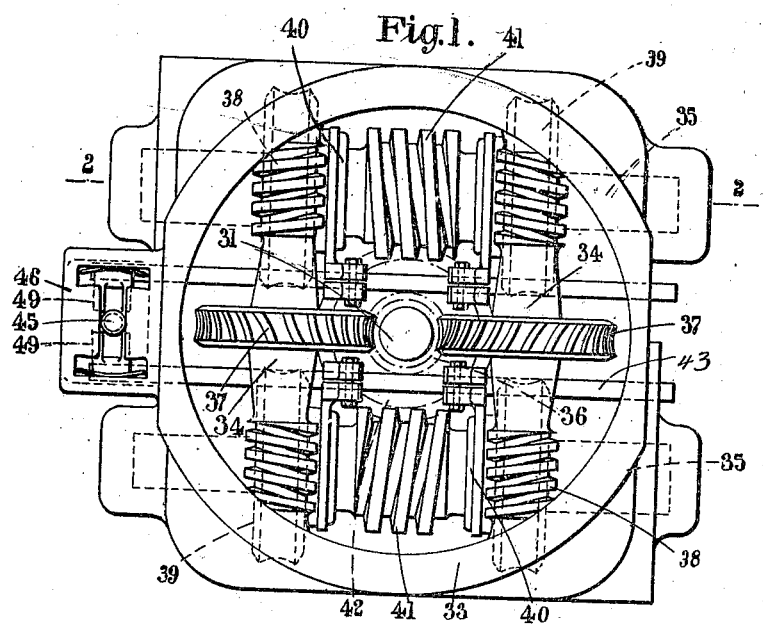
Figure 1 is an end elevation.

Referring to Figures 1, 2 and 3, 31 is a driving shaft 32 a driven shaft and 33 is a casing carrying spindles 34, 35 arranged transversely to each other and to the shafts. The driving shaft 31 has fast thereon a worm 36 in gear with two worm wheels 37 respectively mounted on the spindles 34 each of which carries two worms 38 respectively in gear with worm wheels 39 on the spindles 35. Clutch members 40 slidably keyed on the spindles 35 are provided for coupling the worm wheels 38 individually to the said spindles each of which has fast thereon a worm 41 in gear with a worm wheel 42 on the driven shaft 32. Thus there are provided four different trains of gearing between the driving and driven shafts each train comprising the worm 36 on the driving shaft 31, a worm wheel 37 on a spindle 34, a worm 38 on this spindle, a worm wheel 39 on another spindle 35, a clutch 40, a worm on the spindle last mentioned and the worm wheel on the driven shaft. Each train has a different velocity ratio and the direction of rotation of the driven shaft is either the same or opposite to that of the driving shaft, according to the spiral direction of the worms which may be either right or left handed. Instead of the worm 38 and worm wheel 39 other suitable gears may be employed such as helical gears.

The spindles 35 instead of being arranged transversely to the spindles 34 may be mounted in the cage parallel to the spindles 34 and transversely to the driving and driven shafts. Each spindle 34 can then be geared to a corresponding spindle 35 by more than one train or pair of spur wheels each train or pair being put into or out of gear by suitable clutch devices, and arranged to give a different velocity ratio. Moreover each train between the driving and driven shafts may comprise more than two spindles geared together in succession.

Figure 5:
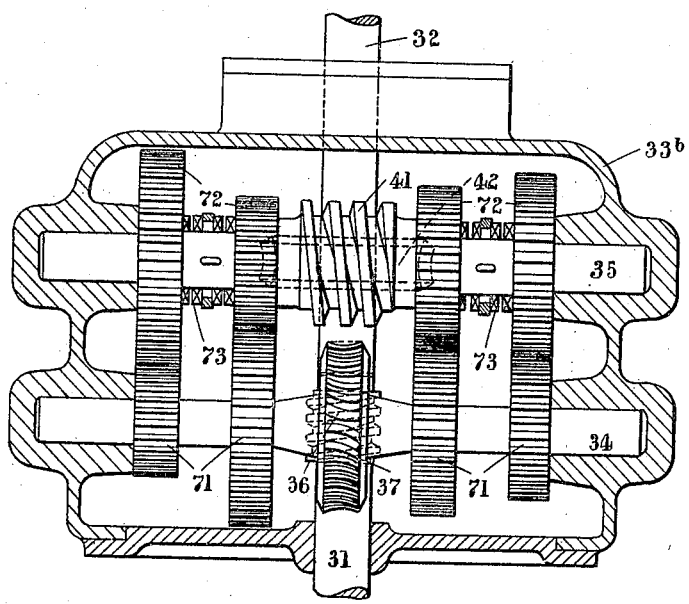
Figure 5 is a view similar to Figure 2 illustrating a modification hereinafter described.

In Figure 5 the spindle 34 is shown arranged parallel to the spindle 35. These spindles may be geared together by any number of spur wheels 71, 72 arranged to give different velocity ratios, each spur wheel 72 being rotatably mounted on the spindle 35 and clutches 73 being provided to clutch any of these wheels 72 to this spindle.

The ends of the several spindles 34, 35 may be extended out of the casing 33 and coupled to controlling, registering or other devices, or to secondary mechanisms associated with that operated by the driven shaft 32.

The clutch members 40 are moved by slidably mounted bars 43 so that by moving these bars longitudinally each clutch may be brought to a position in which it engages with the corresponding clutch part 44 on one of the worm wheels 39. Movement of the bars 43 can be conveniently effected by a lever 45 movable in a gate plate 46. This lever can turn on the pivot 47 to bring its end 48 into a fork 49 on either bar and can then turn on the pivot 50 to move this bar 43 and make either clutch 40, 44 operative accordingly. Clutches may also be provided for coupling each of the worms 39 to the corresponding spindle 35.

The spindles and the shafts may be provided with antifriction thrust bearings, if desired, to transmit end thrust in any shaft or spindle to the fixed part resisting the same.

Figure 2:
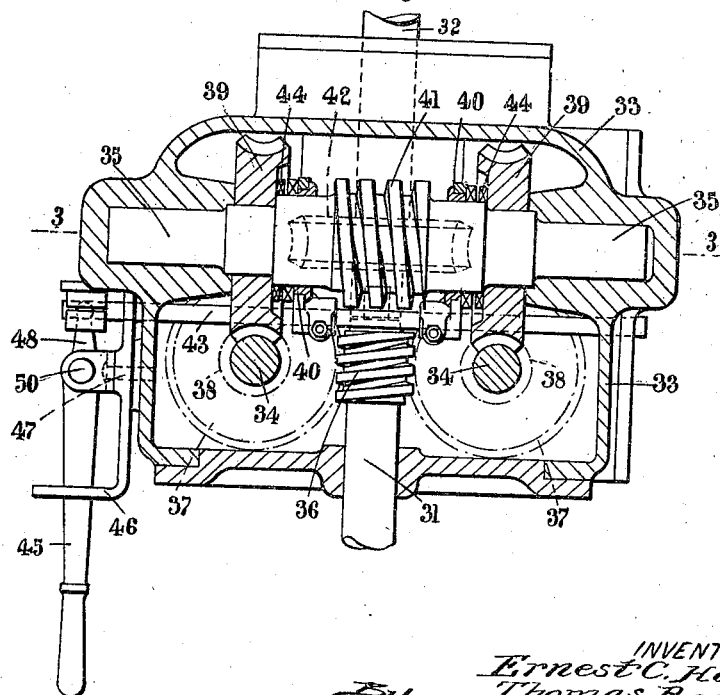
Figure 2 is a sectional plan view on the line 2—2, Figure 1.
Figure 3:
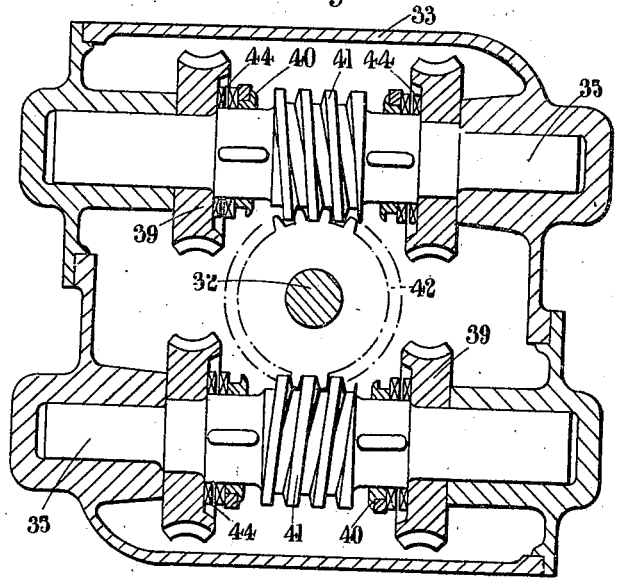
Figure 3 is a transverse section on the line 3—3, Figure 2, of transmission gearing arranged, in accordance with this invention, to provide for four different velocity ratios between the driving and the driven shafts.
Figure 4:
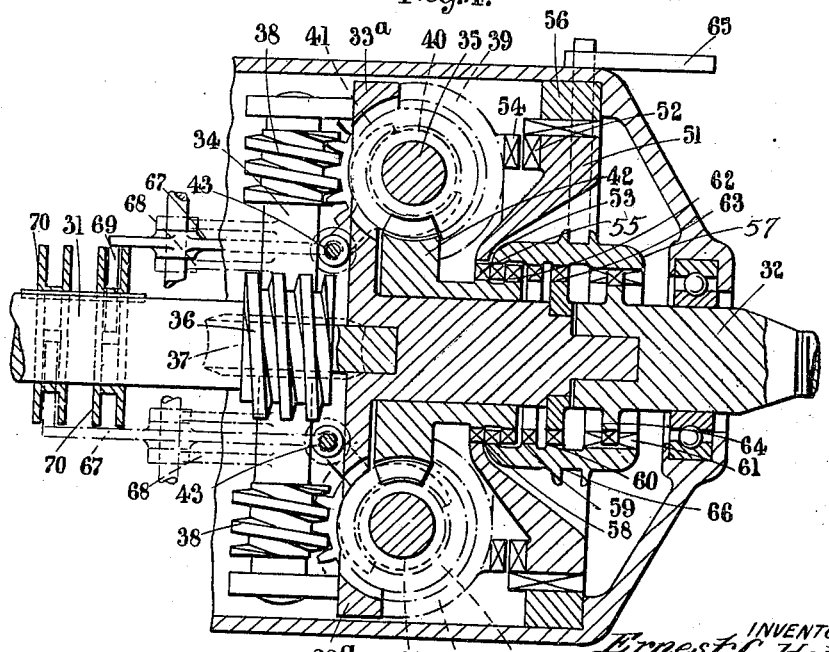
Figure 4 shows in longitudinal central section a modified arrangement of the improved gearing.

The transmission gear described with reference to Figures 1, 2 and 3 provides four distinct transmission trains each train causing rotation of the driven shaft in one direction only. A reversing clutch may be provided so that the resultant direction of motion of the driven shaft when actuated by any of the trains can be reversed without affecting the position of the particular clutch 40, 44 which is operative at that time. For this purpose, as shown in Figure 4, the casing or cage 33ᵃ carrying the spindles 34, 35 is mounted so that it can rotate and the reversing clutch device comprises a clutch ring 51 carrying clutch members 52, 53 which by movement of the ring 51 axially with respect to the shafts 31, 32 can be alternately put into engagement with corresponding clutch members 54, 55 provided on the cage 33ᵃ and on the worm wheel 42, respectively. This worm wheel 42 instead of being fast on the driven shaft 32 is rotatably mounted on an extension of the cage 33ᵃ. The ring 51 is slidably mounted in a non-rotary frame part 56. The clutch device also comprises a rotary sleeve 57 provided with clutch members 58, 59, 60, 61 arranged to couple either the cage 33ᵃ or the driven member 42 alternatively or simultaneously to the driven shaft 32 by engaging clutch members 62, 63, 64 as hereinafter described.

When the ring 51 and sleeve 57 occupy the positions in which they are shown in Figure 4, the clutch members 53, 54 are in engagement so as to hold the worm wheel 42 against rotation, and then rotation of the worm 41 causes the cage 33ᵃ to rotate. The clutch members 58, 59 being out of engagement with the clutch member 62, the sleeve 57 can be rotated by the cage through the clutch members 63, 60 and drive the shaft 32 through the clutch members 61, 64 at a definite velocity relatively to the speed of the driving shaft dependent on the ratios between the gears comprised in the operative train 37, 38, 39, 41, 42. The direction of rotation of the driven shaft may be either the same as or opposite to that of the driving shaft depending on the angular direction of the worm gears.

The direction of rotation of the driven shaft may be reversed by moving the ring 51 and sleeve 57 towards the driving shaft. Then the cage 33ᵃ is held against rotation by engagement of the clutch members 52, 54 the other clutch members 53, 55 being brought out of engagement so as to allow the worm wheel or driven member 42 to rotate driven by the worm 41. The clutch member 59 on the sleeve engages the clutch member 62 on the wheel 42 and transmits motion from this wheel to the shaft 32 through the clutch members 61, 64.

By moving the ring 51 and sleeve 57 from the position in which they are shown in Figure 4, in the direction of the shaft 42, the cage 33ᵃ and worm wheel are both free to rotate but by reason of the simultaneous engagement of the clutch members 58, 62 and 59, 63, relative movement of the cage and wheel is prevented, so that the gearing becomes locked. These parts therefore rotate with the driving shaft 31 and at the same speed carrying with them the shaft 32.

The clutch sleeve 57 and clutch ring 51 can be moved as required without one obstructing the other since the driven member 42, instead of being keyed directly on the driven shaft 32, is mounted on a sleeve or extension integral with the cage 33ª so that the clutch member 54 to be engaged by the clutch member 52 on the ring 51 can be provided at one end of the cage 33ª whilst the clutch member 55 on the worm wheel or driven member 42, to be engaged by the other clutch member 53 on this ring, is provided in a position adjacent to the said clutch member 52. The clutch members 62, 63 and 64 on the worm wheel or driven member, the cage extension and the driven shaft can then be arranged in juxta-position so that they can be engaged by the clutch members provided on the sleeve 57.

The ring 51 and the sleeve 57 can be moved axially simultaneously by an operating rod 65 attached to the ring and having a fork or arm extending into a groove 66 in the sleeve.

The part 56 instead of being fixed may be mounted to rotate and restrained from rotation by springs, latches, or other devices adapted to yield, for example, when subjected to an excessive load, or this part may, if desired, be held to a fixed frame part by a magnetic, liquid circulation, or like clutch.

When the casing or cage carrying the spindles 34, 35 is mounted to rotate, the clutch lever 45 is dispensed with, and the clutch bars 43 are moved by arms or bell crank levers 67 mounted in brackets 68 on the cage 33ª and operated by pins or rollers 69 projecting therefrom into grooved collars 70 slidable on the shaft 31.

What we claim is:

1. Gearing for transmitting motion from a driving to a driven shaft, the said gearing comprising a cage, spindles mounted in the said cage, a worm and a worm wheel gearing the driving shaft to one spindle, a worm and a worm wheel gearing another spindle to the driven shaft, gears connecting the said spindles, and a clutch arranged to couple one member of the train of gearing to the spindle on which the said member is mounted.

2. Gearing for transmitting motion from a driving to a driven shaft, the said gearing comprising a rotary cage, spindles mounted in the said cage, a worm and a worm wheel gearing the driving shaft to one spindle, a worm and a worm wheel gearing another spindle to the driven shaft, gears connecting the said spindles, and a clutch arranged to couple one member of the train of gearing to the spindle on which the said member is mounted.

3. Gearing for transmitting motion from a driving to a driven shaft in alignment therewith, the said gearing comprising a cage, spindles mounted in the said cage transversely to the driving and driven shafts, a worm and a worm wheel gearing the driving shaft to one spindle, a worm and a worm wheel gearing another spindle to the driven shaft, gears connecting the said spindles, and a clutch arranged to couple one member of the train of gearing to the spindle on which the said member is mounted.

4. Gearing for transmitting motion from a driving to a driven shaft, the said gearing comprising a cage, spindles mounted in the said cage, some of the said spindles being geared to the driving shaft and some to the driven shaft by worm and worm wheel gearing, gears connecting each spindle thus geared to the driving shaft to a corresponding spindle geared to the driven shaft, thus providing alternative trains of gearing between the driving and driven shafts, and a clutch in each train arranged to couple one member of the train to the spindle on which the said member is mounted.

5. Gearing for transmitting motion from a driving to a driven shaft, the said gearing comprising a cage, a plurality of spindles mounted in the said cage, gears connecting the said spindles together in succession, a worm and a worm wheel gearing the first spindle of the line of spindles to the driving shaft, a worm and a worm wheel gearing the last spindle of the line of spindles to the driven shaft, and a clutch arranged to couple one member of the said gears to the spindle on which the said gear is mounted.

6. Gearing for transmitting motion from a driving to a driven shaft, the said gearing comprising a rotary cage, spindles mounted in the said cage, a worm and a worm wheel gearing the driving shaft to one spindle, gearing connecting this spindle to another of the said spindles, a worm on the spindle last mentioned in gear with a worm wheel rotatably mounted on the said cage, a clutch for coupling the said worm wheel to the driven shaft, and a clutch for coupling the cage to a non-rotary frame part.

7. Gearing for transmitting motion from a driving to a driven shaft, the said gearing comprising a rotary cage, spindles mounted in the said cage, a worm and a worm wheel gearing the driving shaft to one spindle, gearing connecting this spindle to another of the said spindles, a worm on the spindle last mentioned in gear with a worm wheel rotatably mounted on the said cage, a clutch for coupling the said worm wheel to a non-rotary frame part, and a clutch for coupling the cage to the driven shaft.

8. Gearing for transmitting motion from a driving to a driven shaft, the said gearing comprising a rotary cage, spindles mounted in the said cage, some of the said spindles being geared to the driving shaft and some to the driven shaft by worm and worm wheel gearing, gears connecting each spindle thus geared to the driving shaft to a corresponding spindle geared to the driven shaft, thus providing alternative trains of gearing between the driving and driven shafts, a clutch in each train to render same operative or inoperative, clutches for coupling the cage to a non-rotary frame part and to the driven shaft respectively, and clutches for coupling the last driven member of all the trains of gearing to a non-rotary frame part and to the driven shaft, respectively.

ERNEST CHARLES HATCHER.
THOMAS ROOKE.

Witnesses:
HERBERT A. BEESTON,
CHAS. F. MURPHY.